United States Patent
Tsai et al.

(10) Patent No.: US 7,581,072 B2
(45) Date of Patent: Aug. 25, 2009

(54) METHOD AND DEVICE FOR DATA BUFFERING

(75) Inventors: Wen-Chung Tsai, Taipei (TW); Jung-Tsan Hsu, Taipei (TW)

(73) Assignee: Via Technologies, Inc., Taipei (TW)

( * ) Notice: Subject to any disclaimer, the term of this patent is extended or adjusted under 35 U.S.C. 154(b) by 443 days.

(21) Appl. No.: 11/427,268

(22) Filed: Jun. 28, 2006

(65) Prior Publication Data

US 2006/0282619 A1 Dec. 14, 2006

(30) Foreign Application Priority Data

Oct. 6, 2005 (TW) ............................. 94134938 A

(51) Int. Cl.
*G06F 12/00* (2006.01)
(52) U.S. Cl. ..................... 711/154; 710/22; 710/56; 711/170
(58) Field of Classification Search ............... 711/154, 711/170; 710/22, 56, 57
See application file for complete search history.

(56) References Cited

U.S. PATENT DOCUMENTS

| | | | |
|---|---|---|---|
| 5,003,463 A * | 3/1991 | Coyle et al. ........... | 710/57 |
| 5,859,846 A * | 1/1999 | Kim et al. ........... | 370/395.62 |
| 6,279,087 B1 * | 8/2001 | Melo et al. ........... | 711/146 |
| 6,735,667 B2 | 5/2004 | Hashimoto et al. | |
| 6,864,861 B2 | 3/2005 | Schehrer et al. | |
| 6,882,192 B2 | 4/2005 | Gau | |
| 7,035,948 B1 * | 4/2006 | Liang et al. ........... | 710/56 |

FOREIGN PATENT DOCUMENTS

| | | |
|---|---|---|
| EP | 1523134 | 4/2005 |
| TW | 546564 | 8/2003 |
| TW | 588252 | 5/2004 |
| WO | WO 0250655 A2 * | 6/2002 |

OTHER PUBLICATIONS

TW office action mailed Jun. 12, 2007.

* cited by examiner

*Primary Examiner*—Pierre-Michel Bataille
(74) *Attorney, Agent, or Firm*—Thomas, Kayden, Horstemeyer & Risley

(57) ABSTRACT

A data buffer device that includes a write unit and a read unit, and is disposed between a first interface device and a second interface device is provided. The write unit further includes a first write buffer, a second write buffer and a write controller. The write controller controls the first write buffer and the second write buffer to receive and transmit data from the first interface device to the second interface device alternatively according to the requests of the first interface device and the second interface device. The read unit further includes a first read controller, a first read buffer and a second read buffer. The read controller controls the first read buffer and the second read buffer to receive and transmit data from the second interface device to the first interface device alternatively according to the requests of the first interface device and the second interface device.

19 Claims, 8 Drawing Sheets

METHOD AND DEVICE FOR DATA BUFFERING

BACKGROUND OF THE INVENTION

1. Field of the Invention

The present invention relates to a data buffer device, and more particularly to a data buffer device disposed between two devices each having a different interface respectively.

2. Description of the Related Art

Data is transmitted in a specific format and speed for different interfaces, and thus, a specific buffer is required for data transmission via different interfaces. FIG. 1 is a schematic diagram of a conventional buffer between a bus and a DRAM. In FIG. 1, a state machine 12 is employed for buffering data between bus 11 and DRAM 13. Although the buffer shown in FIG. 1 is easily implemented and inexpensive, the performance of the buffer is inadequate and cannot deal with bi-directional data transmission such that the buffer shown in FIG. 1 cannot process a massive amount of data in a short time.

BRIEF SUMMARY OF THE INVENTION

The invention provides a data buffer device disposed between two devices each having a different interface, and a read/write method for the data buffer device.

The invention provides a data buffer system comprising a first interface device, a second interface device, a first interface controller, a second interface controller and a data buffer device. The first interface controller has a first interface and a first common interface, wherein the first interface controller communicates with the first interface device via the first interface to process requests from the first interface device, and the first interface controller accesses data in a data buffer device via the first common interface. The second interface controller has a second interface and a second common interface, wherein the second interface controller communicates with the second interface device via the second interface to process requests from the second interface device, and the second interface controller accesses data in the data buffer device via the second common interface. The data buffer device includes a write unit and a read unit, wherein the write unit includes a first write buffer, a second write buffer and a write controller, and the read unit includes a first read buffer, a second read buffer and a read controller. The write controller directs the first write buffer and the second write buffer to alternately receive data from the first interface device in response to requests from the first interface device and the second interface device, and transmits the received data to the second interface device. The read controller directs the first read buffer and the second read buffer to alternately receive data from the second interface device in response to requests from the first interface device and the second interface device, and transmits the received data to the first interface device The invention provides a method for an access to a data buffer system between a first interface device and a second interface. The method includes the following steps. First, a first interface controller having a first interface and a first common interface is provides. The first interface controller communicates with the first interface device via the first interface, and communicates with a data buffer device via the first common interface. Next, a second interface controller having a second interface and a second common interface is provides. The second interface controller communicates with the second interface device via the second interface, and communicates with the data buffer device via the second common interface. And then, a data buffer device having a read unit and a write unit is provided, wherein the read unit includes a first read buffer, a second read buffer and a read controller, and the write unit comprises a first write buffer, a second write buffer and a write controller. The first interface device transmits data to the second interface device via the data buffer device when a write operation is applied and when the first interface device reads data from the second interface device via the data buffer device, a read operation is applied. Moreover, the write operation includes the following steps. First, a first write buffer is selected to receive data from the first interface device. Next, when the first write buffer is full, the write controller switches to the second write buffer to receive data. And then, when the first write buffer is partially full and the write operation ends, a next write operation selects the second write buffer to receive data. The read operation includes the following steps. First, a first read buffer is selected to receive data from the second interface device. Next, when the first read buffer is full, the read controller switches to the second read buffer to receive data. And then, when the first read buffer is partially full and the read operation ends, a next read operation selects the second read buffer to receive data.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
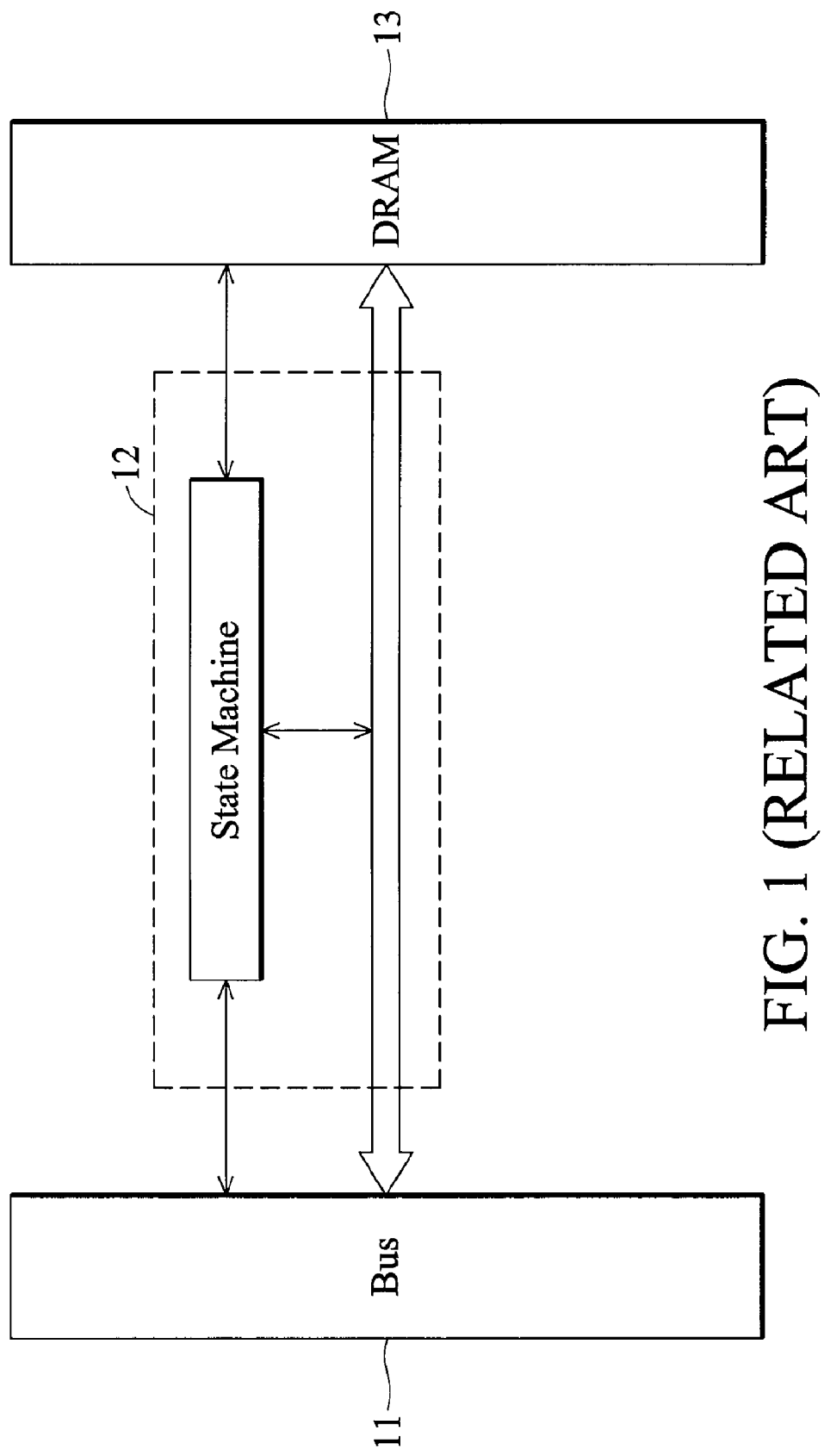
FIG. 1 is a schematic diagram of a conventional buffer between a bus and a DRAM.
Figure 2:
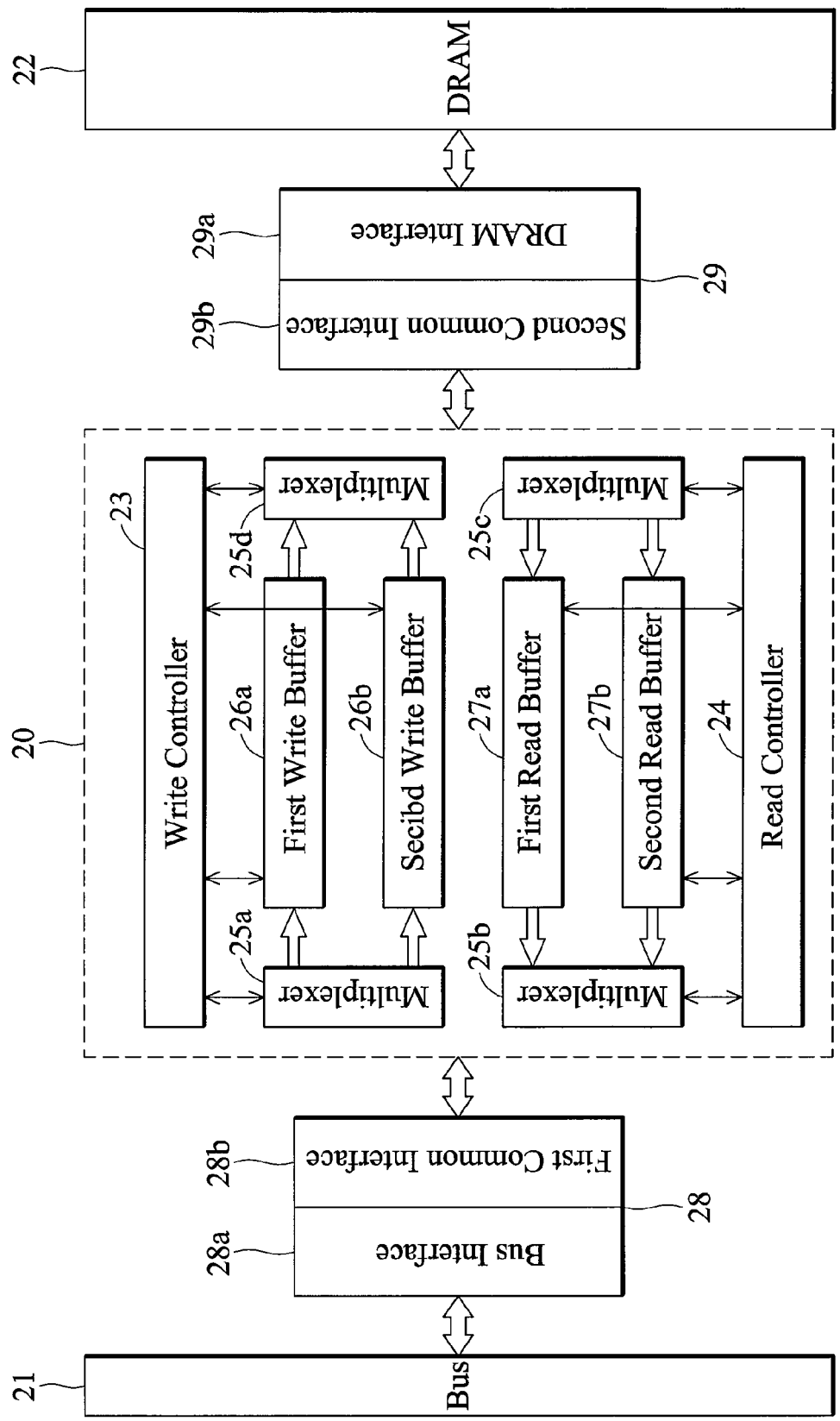
FIG. 2 is a block diagram of one embodiment of the data buffer device of the invention.

FIG. 2 is a block diagram of one embodiment of the data buffer device of the invention. Data is transmitted between bus 21 and DRAM 22 via a data buffer device 20, wherein the bus 21 is a PCI bus, an ISA bus, an AMBA bus, an AHB bus, a SOC/Local bus, an ASB bus, an APB bus, a ZSB bus or a ZPB bus, and DRAM 21 is an SDRAM or a DDR RAM. The bus 21 reads the data buffer device 20 via the bus controller 28 and the data buffer device 20 accesses the DRAM 22 by the DRAM controller 29. The data buffer device 20 communicates with the bus controller 28 via a first common interface 28, and communicates with the DRAM controller 29 via the second common interface 29b. The bus controller 28 communicates with the bus 21 via a bus interface 28a and the DRAM controller 29 communicates with the DRAM 22 via a DRAM interface 29a. According to the described design, only the bus controller 28 or the DRAM controller needs to be changed when the bus 21 or the DRAM 22 is replaced with other type of bus or memory.

The data buffer device 20 includes a write controller 23, a read controller 24, a first write buffer 26a, a second write buffer 26b, a first read buffer 27a, a second read buffer 27b and multiplexers 25a, 25b, 25c and 25d. The first write buffer 26a, second write buffer 26b, first read buffer 27a and second read buffer 27b are FIFO buffers, registers or memory.

When the bus 21 performs a write operation to transmit data to the DRAM 22, the bus 21 transmits a write request to the bus controller 28 and the write controller 23. The write controller 23 selects one write buffer, such as the first write buffer 26a, after receiving the write request. When the bus 21 transmits data to the data buffer device 20 via the first common interface 28b of the bus controller 28, the write controller 23 controls multiplexer 25a to provide a transmission path and pass the data from the bus 21 to the first write buffer 26a. When the first write buffer 26a is full and the write operation does not finish, the write controller 23 controls multiplexer 25a to provide another transmission path and pass the data from the bus 21 to the second write buffer 26b, and the write controller 23 controls multiplexer 25d to transmit data from the first write buffer 26a to the DRAM 22 via the DRAM interface 29a of the DRAM controller 29. When the first write buffer 26a is partially full and the write operation finishes, the write controller 23 controls multiplexer 25d to transmit data from the first write buffer 26a to the DRAM 22 via the DRAM interface 29a of the DRAM controller 29. When one write operation finishes, the write controller 23 records the last used write buffer and when a next write operation begins, the write controller 23 selects any write buffer except for the last used write buffer to begin storing data. For example, the first write buffer 26a and the second write buffer 26b are the buffers for writing. If one write operation finishes and the last using write buffer is the first write buffer 26a, a next write operation begins and selects the second write buffer 26b to receive data.

When the bus 21 processes a read operation to access data from the DRAM 22, the bus 21 transmits a read request to the bus controller 28 and the read controller 24. The read controller 24 selects one read buffer, such as the first read buffer 27a after receiving the read request. When the bus 21 accesses data from the DRAM 22 via the data buffer device 20, the read controller 24 controls the multiplexer 25c to provide a transmission path for transmitting data from the DRAM 22 to the first read buffer 27a. When the first read buffer 27a is full and the read operation is not finished, the read controller 24 controls the multiplexer 25c to provide another transmission path for transmitting data from the DRAM 22 to the second read buffer 27b, and the read controller 24 controls the multiplexer 25b to transmit data sinform the first read buffer 27a to the bus 21 via the bus interface 28a of the bus controller 28. When the first read buffer 27a is partially full and the read operation is finished, the read controller 24 controls the multiplexer 25b to transmit data from the first read buffer 27a to the bus 21 via the bus interface 28a of the bus controller 28. When one read operation is finished, the read controller 24 records the last used read buffer and when a next read operation begins, the read controller 24 selects one read buffer except for the last used read buffer to begin storing data. For example, the first read buffer 27a and the second read buffer 27b are the buffers for reading. If one read operation is finished and the last used read buffer is the first read buffer 27a, a next read operation begins and the second read buffer 27b is selected to receive data.

Furthermore, the data buffer device has a pre-read function and a post-write function with the ability of performing a write operation and a read operation simultaneously.

For example, the first read buffer 27a and the second read buffer 27b are used to illustrate the pre-read function. The first read buffer 27a and the second read buffer 27b are eight double word (DW) FIFO registers, i.e. the FIFO register has 8×32 bits. When the bus 21 reads two continuous eight DW data, the read controller 24 receives and stores the first eight DW data in one read buffer, such as the first reading data buffer 27a, and the second eight DW data in another read buffer simultaneously, such as the second read buffer 27b. Once the bus 21 sends a read request to the read controller 24 for reading the second eight DW data, the read controller 24 controls the multiplexer 25b to provide a transmission path for directly transmitting data from the second read buffer 27b to the bus 21, and thus, the read time can be reduced.

For example, the first write buffer 26a and the second write buffer 26b are used to illustrate the post-write function. Generally speaking, a write operation finishes when the bus 21 receives an ACK signal from the write controller 23 after data is written into the DRAM 22. In order to increase the performance of data buffer device 20, the write controller 23 sends an ACK signal to the bus 21, and then transmits data from the first write buffer 26a to the DRAM 22 when data is written into one buffer, such as the first write buffer 26,. At the same time, data, which is sent from bus 21, can be stored into the second write buffer 26b so that the write time is reduced and the performance of the data buffer device 20 gets improved.

Figure 3:
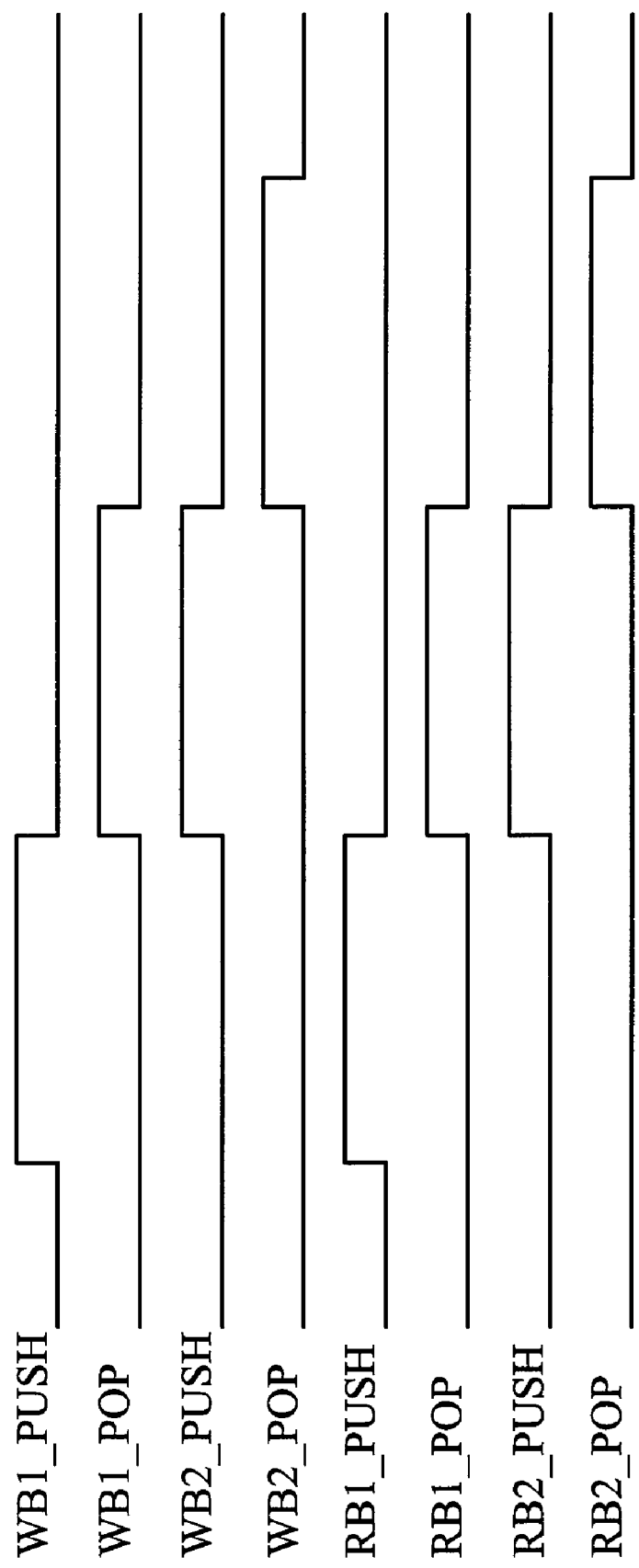
FIG. 3 is a waveform according to an access to the data buffer device of FIG. 2.

FIG. 3 is a waveform according to an access to the data buffer device of FIG. 2. WB1, WB2, RB1 and RB2 respectively indicate access conditions of the first write buffer 26a, the second write buffer 26b, the first read buffer 27a and the second read buffer 27b. PUSH indicates that the buffers receive data and POP indicates that the buffers output data. WB1_PUSH indicates that the first write buffer 26a receives data from the bus 21, and WB1_POP indicates that the first write buffer 26a transmits data therein to the DRAM 22. RB1_PUSH indicates that the first read buffer 27a receives data from the DRAM 22, and RB1_POP indicates that the first read buffer 27a transmits data therein to the bus 21. When the first write buffer 26a transmits data therein to the DRAM 22, the second write buffer 26b receives data from bus 21. Moreover, the read buffer, such as the first read buffer 27a, and the write buffer, such as the first write buffer 26a, can work simultaneously. According to the described operation, the data buffer device 20 utilizes two access paths, such as a writing path or a reading path, to implement the bi-directional transmission and gain performance.

Figure 4:
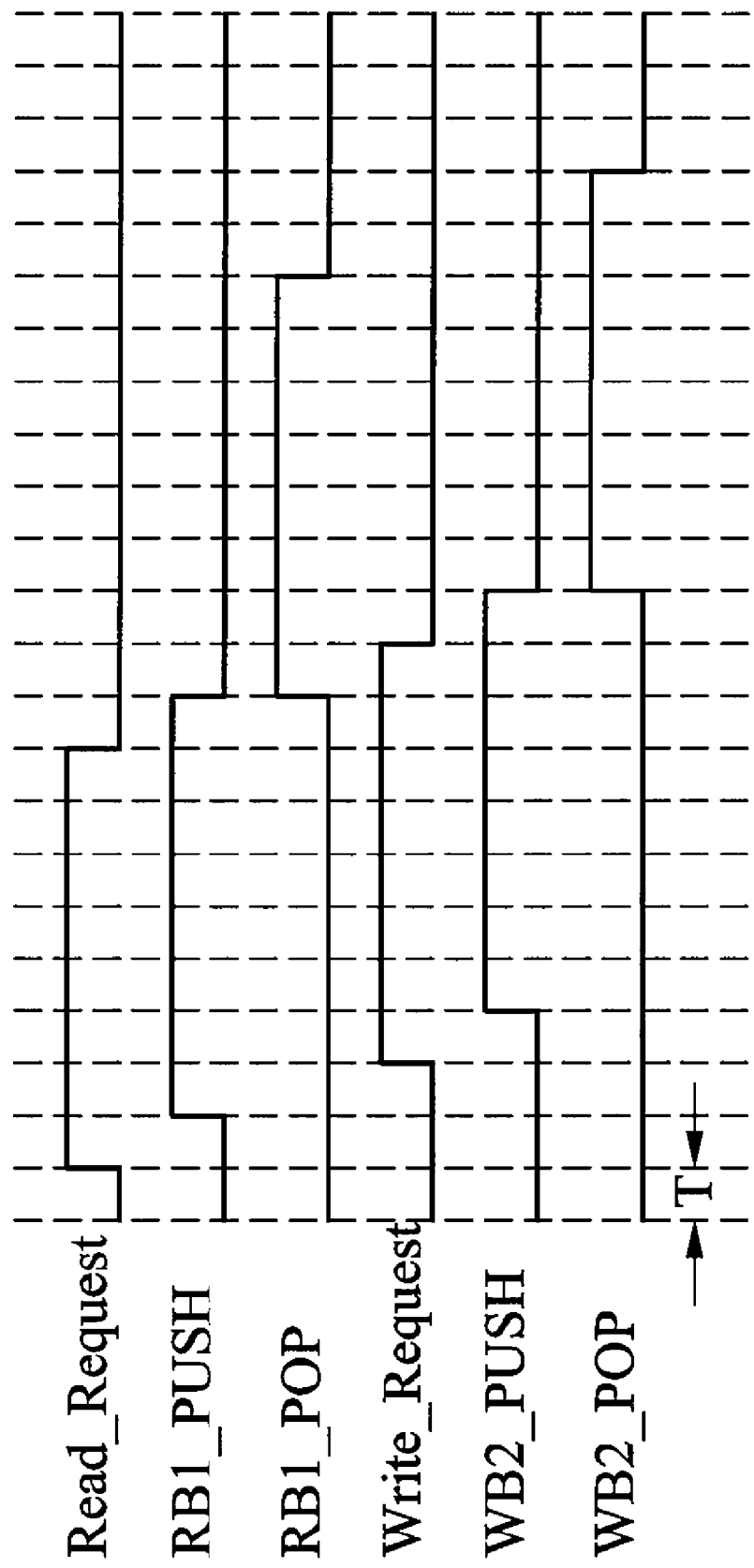
FIG. 4 is a timing diagram according to an access to the data buffer device of FIG. 2.

In a conventional data buffer device, the data length information is included in the read request or write request. In the invention, the data length is determined by the request time interval. Turning first to FIG. 4, a timing diagram according to an access to the data buffer device 20 of FIG. 2 is illustrated. When the read controller 24 receives a read request, Read_Request, from the bus 21, a read buffer, such as the first read buffer 27a, is selected to receive data from the DRAM 22. In the embodiment, the bus 21 reads eight DW data so that the Read_Request should be enabled for lasting an eight-clock cycle time period, T, and the RB1_PUSH also should be enabled for lasting an eight-clock cycle time period. When the first read buffer 27a is full, the RB1_POP is enabled and the received data is transmitted to the bus 21 for lasting an eight-clock cycle time period.

When the write controller 23 receives a write request, Write_Request, from the bus 21, a write buffer, such as the first write buffer 26a, is selected to receive data from the bus 21. In this embodiment, the bus 21 writes eight DW data into the DRAM 22 so that the Write_Request is enabled for lasting an eight-clock cycle time period, and the WB1_PUSH is also enabled for lasting an eight-clock cycle time period. When the first write buffer 26a is full, the WB1_POP is enabled and the received data is transmitted to the DRAM 22 for an eight-clock cycle time.

Except for the continuous data transmission, the data buffer device 20 also can transmit data from any address segment of a buffer to the bus 21 or the DRAM 22. For example, if the bus 21 has an eight DW data, but only from the fifth to the eighth one of the eight DW data needs to be written into the DRAM 22, the write controller 23 transmits the eight DW data to one write buffer, but only from the fifth to the eighth one is written into the DRAM. Similarly, the bus 21 can read data from any address segment of the DRAM 22.

Turning back to FIG. 2, a complete write operation includes the following steps, such as writing data into the data buffer device 20 from the bus 21 and writing data into the DRAM 22 from the data buffer device 20. To further illustrate the operation, please refer to FIG. 5 and FIG. 6.

Figure 5:
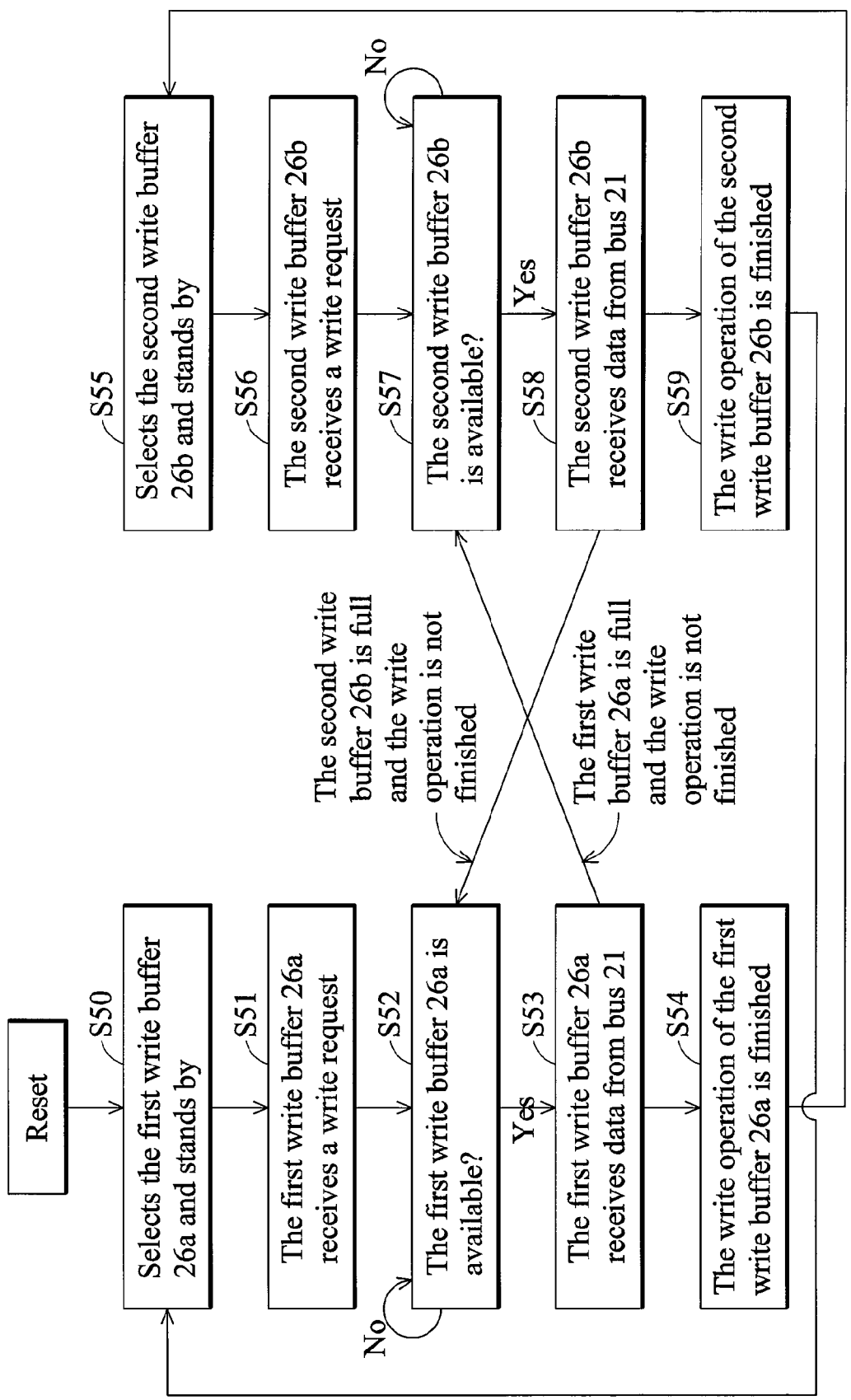
FIG. 5 is a flowchart of data transmission from the bus to the data buffer device in FIG. 2.

FIG. 5 is a flowchart of data transmission from the bus 21 to the data buffer device 20 in FIG. 2. In step S51, the first write buffer 26a receives a write request, such as Write_Request. Next, the bus 21 checks whether the first write buffer 26a is available in step S52. If yes, data is transmitted from the bus 21 to the first write buffer 26a in step S53. If no, the bus 21 keeps on checking whether the first write buffer 26a is available in step S52. If the first write buffer 26a is still full and the write operation is not finished, the bus 21 checks whether the second write buffer 26b is available in step S57. If yes, data is transmitted from the bus 21 to the second write buffer 26b in step S58. If no, the bus 21 keeps on checking whether the second write buffer 26b is available in step S57. If the second write buffer 26b is still full and the write operation is not finished, the bus 21 checks whether the first write buffer 26a is available in step S52. If yes, data is transmitted from the bus 21 to the first write buffer 26a in step S53. If no, the bus 21 keeps on checking whether the first write buffer 26a is available in step S52. When the write operation is finished, the first write buffer 26a is selected and waits for the next action in step S50 or the second write buffer 26b is selected and waits for the next action in step S55.

Figure 6:
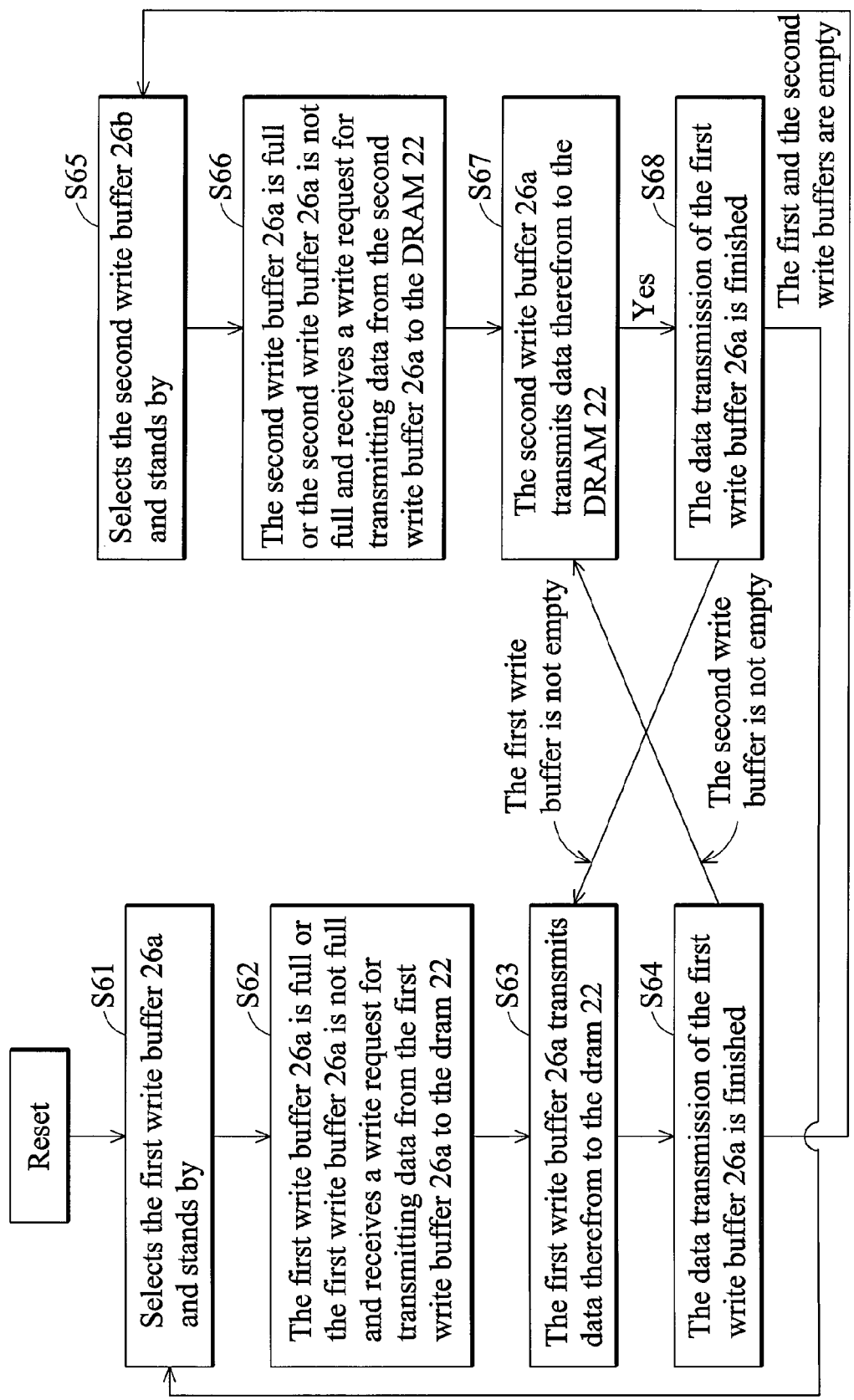
FIG. 6 is a flowchart of data transmission from the data buffer device to the DRAM in FIG. 2.

FIG. 6 is a flowchart of data transmission from the data buffer device 20 to the DRAM 22 in FIG. 2. If the first write buffer 26a receives a write request for writing data into the DRAM 22 whether the first write buffer 26a is full in step S62, the data is transmitted from the first write buffer 26a to the DRAM 22 in step S63. When the data transmission is finished in step S64, the bus 21 checks whether the second write buffer 26b is empty. If yes, the second write buffer 26b is selected and waits for the next action in step S65. If no, the second write buffer 26b receives a write request for writing data into the DRAM 22 whether the second write buffer 26b is full in step S66. And then, the data is transmitted from the second write buffer 26b to the DRAM 22 in step S67. When the data transmission is finished in step S68, the first write buffer 26a is selected and waits for the next action in step S61. Furthermore, if the first write buffer 26a is not empty in step S68, the data is kept on transmitting from the first write buffer 26a to the DRAM 22 in step S63.

Turning back to FIG. 2, a complete read operation includes the following steps, such as reading data from the DRAM 22 by the data buffer device 20 and reading data from the data buffer device 20 by the bus 21. To further illustrate the operation, please refer to FIG. 7 and FIG. 8.

Figure 7:
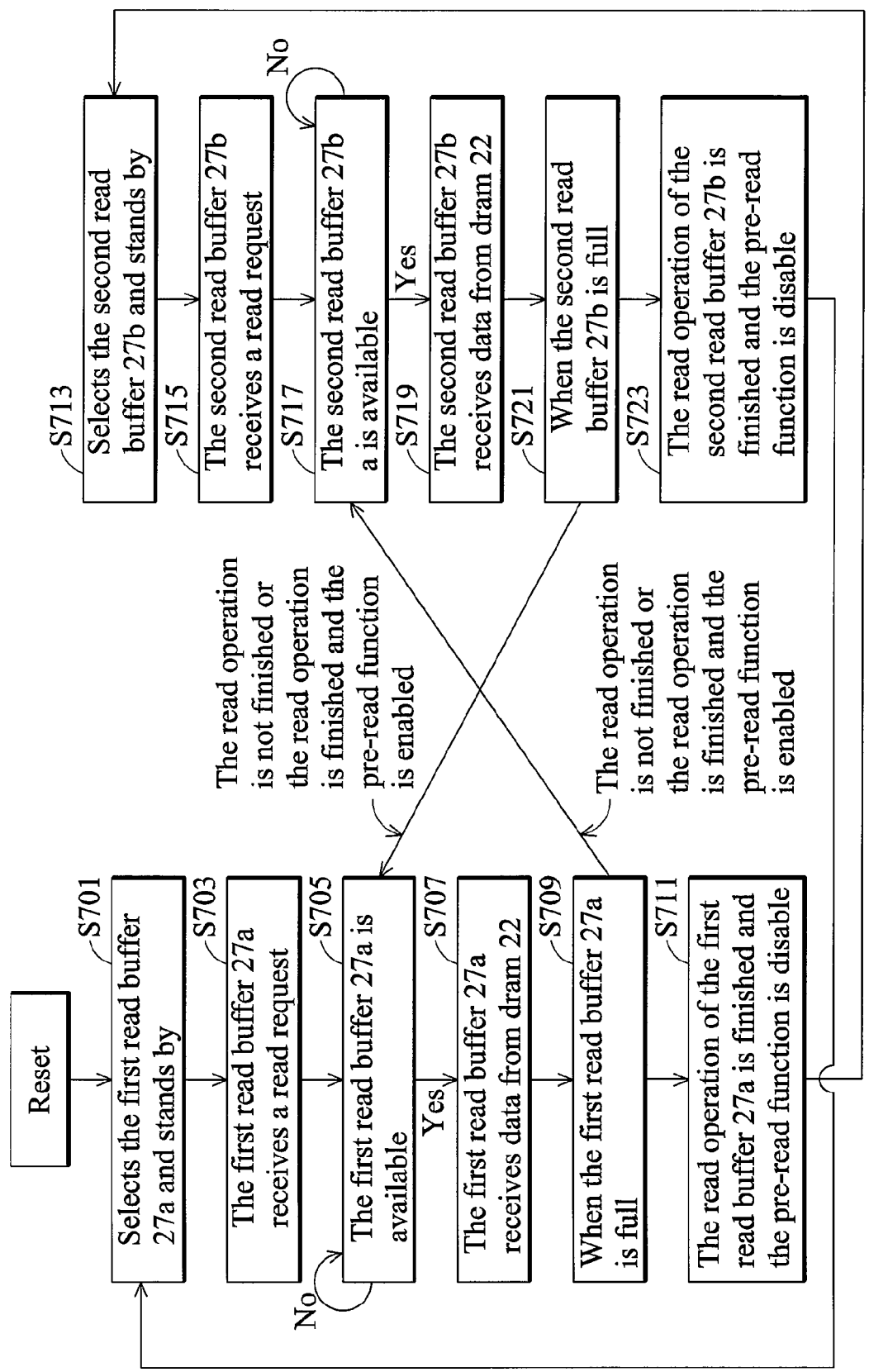
FIG. 7 is a flowchart of data transmission between the data buffer device and the DRAM.

FIG. 7 is a flowchart of data transmission between the data buffer device 20 and the DRAM 22. In step S703, the first read buffer 27a receives a read request, such as Read_Request. Next, the data buffer device 20 checks whether the first read buffer 27a is available in step S705. If yes, data is transmitted from the DRAM 22 to the first read buffer 27a in step S707. If no, the data buffer device 20 keeps on checking whether the first read buffer 27a is available in step S705. If the first read buffer 27a is fully filled with data and the data buffer device 20 enables a pre-read function whether the read operation is finished in step S709, the data buffer device 20 selects the second read buffer 27b to keep on receiving data from the DRAM 22 in step S717. For example, if the data buffer device 20 enables the pre-read function or the first read buffer 27a, which is an eight DW register, doesn't have enough space to buffer the data of which length is greater than eight DWs, the data buffer device 20 selects the second read buffer 27b to keep on receiving data from the DRAM 22 in step S717. Following the step S709, if the first read buffer 27a finishes reading data from DRAM 22 and the data buffer device 20 does not enable the pre-read function in step S711, the second read buffer 27b is selected and waits for the next action in step S713.

When the second read buffer 27b receives a read request, such as Read_Request in step S715, the data buffer device 20 checks whether the second read buffer 27b is available in step S717. If yes, data is transmitted from the DRAM 22 to the second read buffer 27a in step S719. If no, the data buffer device 20 keeps on checking whether the second read buffer 27b is available in step S717. If the second read buffer 27a is fully filled with data and the data buffer device 20 enables a pre-read function whether the read operation is finished in step S721, the data buffer device 20 selects the first read buffer 27a to keep on receiving data from the DRAM 22 in step S705. Following the step S721, if the second read buffer 27b finishes reading data from DRAM 22 and the data buffer device 20 does not enable the pre-read function in step S723, the first read buffer 27a is selected and waits for the next action in step S701.

Figure 8:
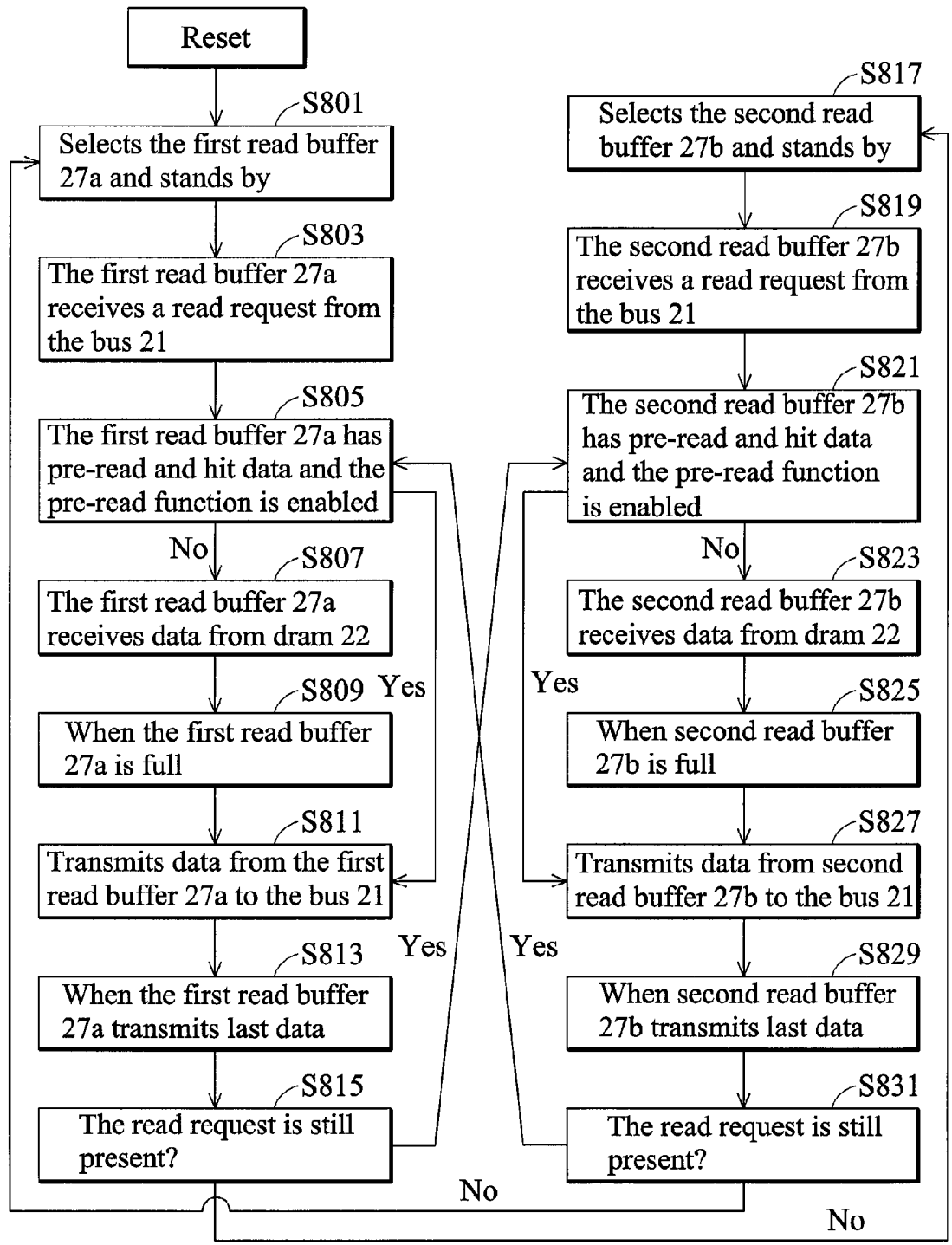
FIG. 8 is a flowchart of data transmission between the bus and the data buffer device.

FIG. 8 is a flowchart of data transmission between the bus 21 and the data buffer device 20. When the first read buffer 27a receives a read request from the bus 21 in step S803, the data buffer device 20 checks whether the pre-read function is enabled and the first read buffer 27a has pre-read data that is needed in step S805. If yes, data is transmitted from the first read buffer 27a to the bus 21 in step S811. If no, data is transmitted from the DRAM 22 to the first read buffer 27a in step S807. Following the step S807, when the first read buffer 27a is full or receives a read request in step S809, the data buffer device 20 transmits data from the first read buffer 27a to the bus 21 in step S811. Following the step S811, when the last data is transmitted from the first read buffer 27a to the bus 21 in step S813, the data buffer device 20 checks whether the read request is still issued from the bus 21 in step S815. If yes, the data buffer device 20 checks whether the pre-read function is enabled and the second read buffer 27b has pre-read data that is needed in step S821. If no, the second read buffer 27b is selected and waits for the next action in step S817.

When the second read buffer 27b receives a read request from the bus 21 in step S819, the data buffer device 20 checks whether the pre-read function is enabled and the second read buffer 27b has pre-read data that is needed in step S821. If yes, data is transmitted from the second read buffer 27b to the bus 21 in step S827. If no, data is transmitted from the DRAM 22 to the second read buffer 27b in step S823. Following the step S823, when the second read buffer 27b is full or receives a read request in step S825, the data buffer device 20 transmits data from the second read buffer 27b to the bus 21 in step S827. Following the step S827, when the last data is transmitted from the second read buffer 27b to the bus 21 in step S829, the data buffer device 20 checks whether the read request is still issued from the bus 21 in step S831. If yes, the data buffer device 20 checks whether the pre-read function is enabled and the first read buffer 27b has pre-read data that is needed in step S805. If no, the first read buffer 27a is selected and waits for the next action in step S801.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A read/write method for a data buffer system between a first interface device and a second interface device, comprising:
   providing a first interface controller having a first interface and a first common interface, wherein the first interface controller communicates with the first interface device via the first interface, and communicates with a data buffer device via the first common interface;
   providing a second interface controller having a second interface and a second common interface, wherein the second interface controller communicates with the second interface device via the second interface, and communicates with the data buffer device via the second common interface;
   providing the data buffer device having a read unit and a write unit, wherein the read unit comprises a first read buffer, a second read buffer and a read controller, and the write unit comprises a first write buffer, a second write buffer and a write controller; and
   applying a write operation when the first interface device transmits data to the second interface device via the data buffer device, the write operation comprising:
      transmitting a write request from the first interface device to the first interface controller via the first interface;
      transmitting the write request from the first interface controller to a write controller via the first common interface; and
      receiving data that needs to be stored in the write unit from the first interface device via the first interface by the write controller, wherein this step further comprises:
         selecting a first write buffer to receive data from the first interface device;
         switching the write controller to the second write buffer to receive data when the first write buffer is full; and
         selecting the second write buffer to receive data according to a next write operation when the first write buffer is not full and the write operation ends; and
   applying a read operation when the first interface device reads data from the second interface device via the data buffer device, the read operation comprising:
      transmitting a read request from the first interface device to the first interface controller via the first interface;
      transmitting the read request from the first interface controller to a read controller via the first common interface; and
      reading data that is stored in the read unit from the second interface device via the first interface by the read controller, wherein this step further comprises:
         selecting a first read buffer to receive data from the second interface device;
         switching the read controller to the second read buffer to receive data when the first read buffer is full; and
         selecting the second read buffer to receive data according to a next read operation when the first read buffer is not full and the read operation ends.

2. The method as claimed in claim 1, further comprising: transmitting data from the first write buffer to the second interface device by the write controller via the second interface controller when the first write buffer is full.

3. The method as claimed in claim 1, further comprising: transmitting data from the first read buffer to the first interface device by the read controller via the first interface controller when the first read buffer is full.

4. The method as claimed in claim 1, further comprising: prestoring a next one data into the second read buffer by the read controller for a pre-read function when the first read buffer receives one data.

5. The method as claimed in claim 1, further comprising: transmitting data from the first write buffer to the second interface device by the write controller when the first write buffer is partially full and the write operation ends.

6. The method as claimed in claim 1, further comprising: transmitting data from the first read buffer to the first interface device by the read controller when the first read buffer is partially full and the read operation ends.

7. The method as claimed in claim 1, further comprising: stopping the write operation in the first write buffer by the write controller;
switching to the second write buffer to receive data from the first interface device by the write controller; and
transmitting data from the first write buffer to the second interface device by the write controller when the first write buffer is partially full and the write controller receives another write request.

8. The method as claimed in claim 1, further comprising: stopping the read operation in the first read buffer by the read controller;
switching to the second read buffer to receive data from the second interface device by the read controller; and
transmitting data from the first read buffer to the first interface device by the read controller when the first read buffer is partially full and the read controller receives another read request.

9. A data buffer system, comprising:
a first interface device;
a second interface device;
a first interface controller having a first interface and a first common interface, wherein the first interface controller communicates with the first interface device via the first interface to process requests from the first interface device, and the first interface controller accesses data in a data buffer device via the first common interface, and further wherein the first interface controller receives a request from the first interface device and the length of data requested by the request from the first interface device is determined by time interval of the request;
the data buffer device comprising:
   a write unit, comprising:
      a first write buffer;

a second write buffer; and a write controller directing the first write buffer and the second write buffer to alternately receive data from the first interface device in response to requests from the first interface device and the second interface device, and transmitting the received data to the second interface device; and a read unit, comprising:

a first read buffer;

a second read buffer; and a read controller directing the first read buffer and the second read buffer to alternately receive data from the second interface device in response to requests from the first interface device and the second interface device, and transmitting the received data to the first interface device; and a second interface controller having a second interface and a second common interface, wherein the second interface controller communicates with the second interface device via the second interface to process requests from the second interface device, and the second interface controller access data in the data buffer device via the second common interface.

10. The system as claimed in claim 9, further comprising a multiplexer receiving and transmitting the data from the first interface device to one of the first write buffer and the second write buffer in response to the write controller.

11. The system as claimed in claim 9, further comprising a multiplexer receiving and transmitting the data from the first write buffer or the second write buffer to the second interface device.

12. The system as claimed in claim 9, further comprising a multiplexer receiving and transmitting the data from the first read buffer or the second read buffer to the first interface device.

13. The system as claimed in claim 9, further comprising a multiplexer receiving and transmitting the data from the second interface device to one of the first read buffer and the second read buffer in response to the read controller.

14. The system as claimed in claim 9, wherein the first write buffer, the second write buffer, the first read buffer and the second read buffer are FIFO buffers.

15. The system as claimed in claim 9, wherein the read unit and the write unit work simultaneously.

16. The system as claimed in claim 9, wherein the first common interface and the second common interface are specific and fixed interfaces for the data buffer device.

17. The system as claimed in claim 16, wherein the first interface controller receives a request from the first interface device and the length of each transmitted data is determined by the request time interval.

18. The system as claimed in claim 9, wherein the read unit has a pre-reading function and when the first read buffer stores a first data, the read controller controls the second read buffer to store a second data.

19. The system as claimed in claim 9, wherein the first interface controller can read data at any address of the first read buffer or the second read buffer.

* * * * *